Nov. 30, 1937.  L. L. IRVIN  2,100,693
PARACHUTE PACK FASTENING AND RELEASING MECHANISM
Filed April 8, 1935  3 Sheets-Sheet 1

INVENTOR,
Leslie L. Irvin
BY Lancaster, Allwine & Rommel
ATTORNEYS.

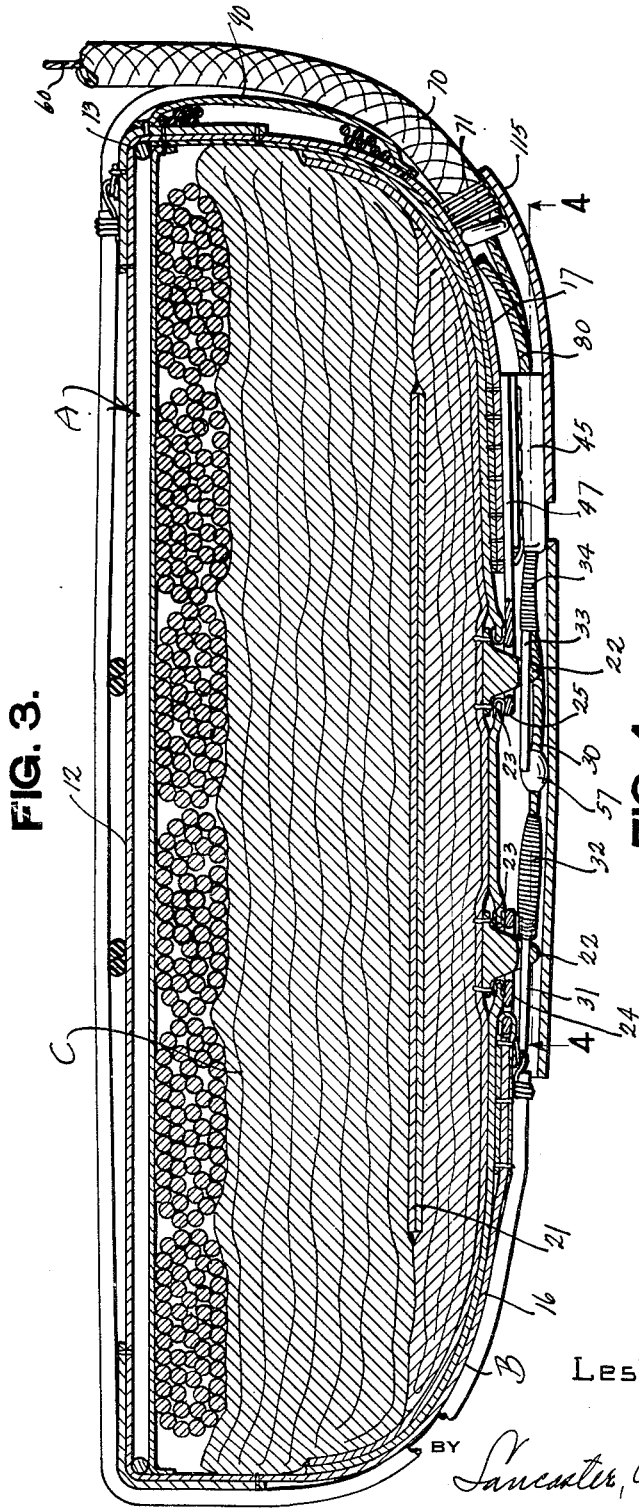

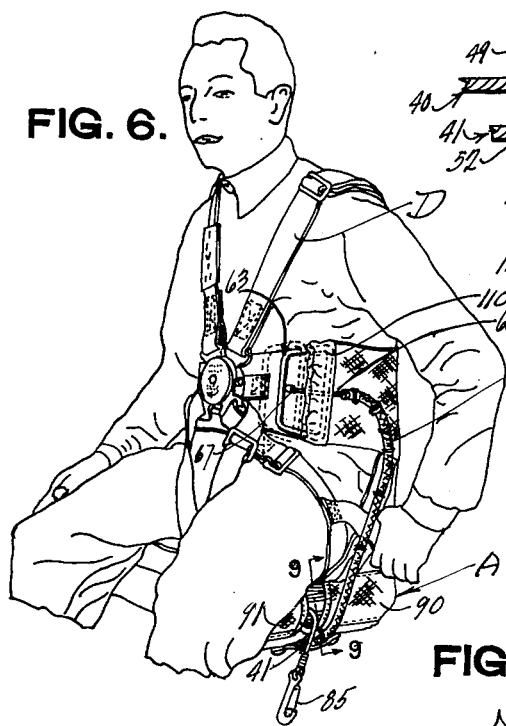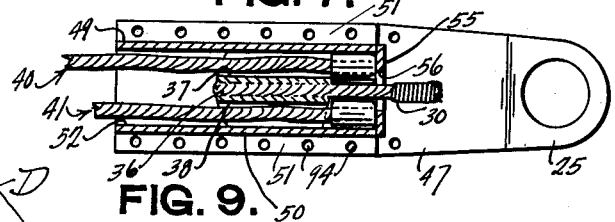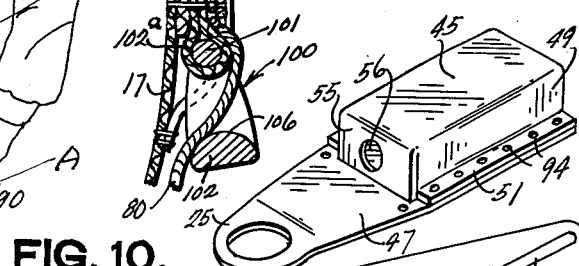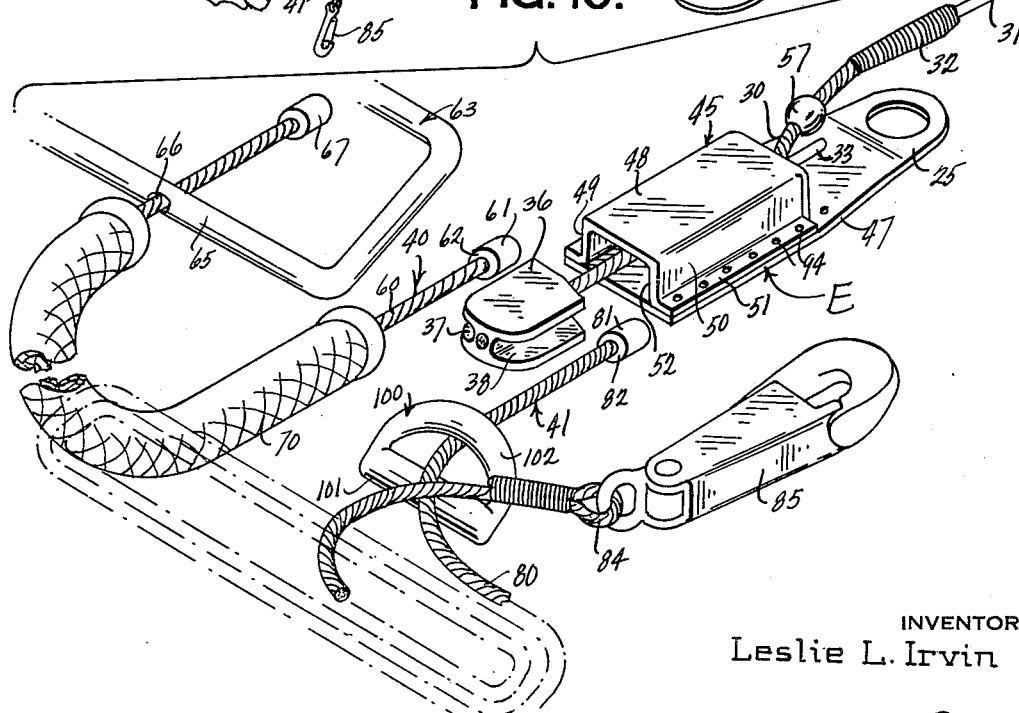

Patented Nov. 30, 1937

2,100,693

UNITED STATES PATENT OFFICE 2,100,693

PARACHUTE PACK FASTENING AND RELEASING MECHANISM

Leslie L. Irvin, Letchworth, England, assignor to Irving Air Chute Company, Inc., Buffalo, N. Y., a corporation Application April 8, 1935, Serial No. 15,300

10 Claims. (Cl. 244—148)

This invention relates to improvements in parachute apparatus.

The primary object of the invention is the provision of an improved parachute pack having an improved release mechanism for either manually or automatically opening the pack.

It is well known in the art to provide both means for manual opening of a parachute pack and means to insure the automatic opening of the pack, such as by connecting the fastening mechanism of the pack by static line to some part of an aircraft whereby when the wearer of the parachute pack jumps from the craft the static line due to its connection with the aircraft will cause an automatic opening of the parachute pack. In the present invention the fastening mechanism includes independently operable manual and automatic cables which are connected releasably to a slidable fastening pin assemblage in such manner as to insure efficiency and safety in operation.

A further object of this invention is the provision of an improved rip cord assemblage for parachute packs and containers which includes a rip cord handle having the rip cord operatively connected therewith so that the rip cord may move in alignment with itself relative to the handle so as to enable the shortening of the cord part of the assemblage, as sometimes results during movements of the body of the wearer, and thus avoiding liability of pushing of the rip cord handle from its pocket upon the harness or clothing of the wearer.

Other objects and advantages of the invention will be apparent during the course of the following detailed description.

In the accompanying drawings, forming a part of this specification, and wherein similar reference characters designate corresponding parts throughout the several views, Figure 1 is a plan view of the parachute pack, showing the improved manual and automatic rip cord details.

Figure 3 is an enlarged transverse sectional view taken through the pack substantially on the line 3—3 of Figure 1, and showing details of the improved pack fastening and release rip cord mechanism.

Figure 4 is a fragmentary sectional view taken substantially on the line 4—4 of Figure 3, but omitting details of the pack and fastening studs of the container.

Figure 5 is a cross sectional view taken substantially on the line 5—5 of Figure 4.

Figure 6 is a view showing the wearer encased in parachute apparatus including a harness and a pack, and having the improved automatic and manual rip cord assemblages associated therewith.

Figure 7 is a sectional view taken longitudinally through the slide block of the fastener mechanism for the container of the pack and showing the association therewith in assembled form of the manual and automatic rip cords.

Figure 8 is a perspective view of the grommet-case used as a part of the pack fastening and rip cord assemblage.

Figure 9 is a sectional view taken substantially on the line 9—9 of Figure 6, and more particularly showing a ring for guiding the direction of pull of the automatic rip cord.

Figure 10 is an enlarged fragmentary perspective view of the associated details of the parachute pack container fastening and rip cord assemblage.

Figure 1:
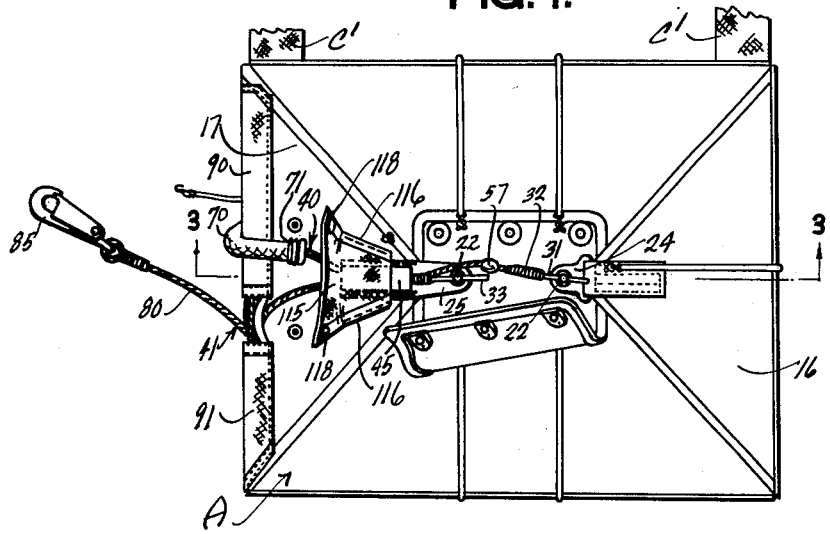

In the drawings, wherein for the purpose of illustration is shown only a preferred embodiment of the invention, the letter A may generally designate a parachute pack which includes a container B. The pack houses a parachute canopy C and the usual shroud lines and suspension lines. The latter may form part of the harness D. Improved fastening and rip cord means E is provided, shown in assemblage in Figure 1 of the drawings and in detail in Figures 2 and 10.

The parachute pack is generally of the nature of the "standard" pack now in use throughout the United States and foreign countries, as set forth in U. S. Patent #1,554,192. The container B includes a body wall 12, which may be of semi-rigid character and preferably square or rectangular in shape. It has a wire frame 13 associated therein in the usual manner so that the pack may be built up to a definite shape. Main side flaps 14 and 15 are hinged to opposite sides of the body wall 12, and end walls 16 and 17 are similarly provided. The entire container may be of canvas or other flexible material. Of course the shape, size, and arrangement of parts of the container may vary widely, and if desired, the closure for the container may be separate from the body thereof and the pack may be of circular, triangular, or other shape than that shown in the drawings, so far as the present invention is concerned.

The packing arrangement of shroud lines and main and pilot parachutes is not essential to the present invention. However, a conventional packing system may be employed which includes the placing of the ends of the suspension lines, shown at C', in Figure 1 of the drawings so that they extend into the pack. The shroud lines are of course connected therewith and bundled together and placed zig-zag back and forth within the pack and suitably retained therein in accordance with standard practice. The main parachute C is packed zig-zag upon the shroud lines and if a pilot parachute is used flexible flaps 21 of the usual nature may be provided on the inside of the main flaps 14 and 15 to partition the pilot parachute from the main parachute, as set forth in U. S. Patent #1,403,983.

In the standard parachute pack, such as shown in the drawings, fastening studs are fixed upon one or more flaps releasably receiving thereupon grommets which are attached to other flaps. Rip cord prongs will then slip through openings in the studs in order to hold the flaps assembled and close the container with the parachute and shroud lines housed therein. In the present invention I prefer to provide studs 22 upon the flap 15. The opposite side flap 14 is provided with eyelets 23 which slip over the studs 22. The end flaps 16 and 17 are respectively provided with metallic extension studs 24 and 25 respectively, each of which slips over one of the studs 22. These studs 22 are apertured as shown in Figure 3 to receive the fastening pins of the rip cord assemblage in order that the grommets may be retained upon the studs 22 and thus holding the flaps of the container in closing relation.

Referring to the fastening means and rip cord mechanism, a short length of flexible wire cabling 30 is provided, having at the extreme end thereof a rigid fastening pin 31 secured by the usual soldered copper wound wire 32 in place upon the cable body 30, and which soldered copper wire winding 32 provides an enlargement which will not enter the aperture of the stud 22. Intermediate its ends the cable body 30 is also provided with a second rigid fastening pin 33 which is secured by the wound copper wire 34 in position to enter the aperture of the stud 22, as shown in Figure 3. At its extreme end opposite the pin 31, the short length of flexible wire cabling 30 is provided with a rip cord retainer block or member 36, preferably of light metal, which is provided with an opening therethrough into which the extreme end of the cable body 30 is force fitted and soldered, or secured in any other approved manner. At opposite sides of the cable 30 the slide block or member 36 is provided with oppositely facing laterally open channels 37 and 38 adapted to receive therein the flexible wire manual and automatic rip cords 40 and 41, for a purpose to be subsequently described.

As part of the assemblage E there is provided a guide case 45 for the channel block or member 36. The latter is of substantially rectangular shape in plan and relatively shallow. Its opposite sides are parallel. The case 45 includes a base 47, the extreme end of which is apertured and forms the grommet 25 attached to the container flap 17. The top 48 of the case has end walls 49 and 50 arranged normal thereto which are flanged at 51 and preferably spot welded or otherwise secured upon the base 47 to provide an elongated shallow compartment passageway 52 slidably receiving the guide retaining block 36 therein. The width and height of the passageway 52 is such as to rather snugly but slidably receive the rip cord retaining member 36 therein against lateral play or rotation.

The case 45 furthermore includes an end wall 55 facing the grommet 25, which is provided with an opening 56 therein through which the flexible cable body 30 is threaded.

The fastening cable 30; its fastening pins 31 and 33 and the retaining block 36 are secured to the end wall 55 of the case, so that this fastening arrangement will not become detached or lost when the container is opened. The assemblage of the cable 30 with respect to the case is accomplished by threading the pin end 31 of the cable 30 through the opening 56 of the case 45 and thereafter soldering or otherwise securing an oval-shaped lug or stop projection 57 upon the cable 30 between the copper windings 32 and 34 and immediately at the extreme end of the fastening pin 33 so that the latter contacting the oval-shaped projection 57 will form an obstruction to prevent retraction of the cable 30 and its parts with respect to the case 45, shown in Figure 4 of the drawings.

When the retaining block 36 is disposed within the passageway 52 of the case 45 it will be noted that the end walls of the case 45 close the channels in order to prevent lateral displacement of the rip cord devices 40 and 41.

Referring to the manually operated rip cord 40, the same includes the flexible cable body 60 having an enlargement 61 at the pack associated end thereof, defining a shoulder 62 for cooperation against the inner end of the retaining block 36 when the cable body 60 is disposed in a side channel of said block. This flexible cable body 60 at its upper end is provided with a rip cord handle 63 of any approved type, but preferably of the trapezoidal form set forth in my U. S. Patent #1,758,795. The connection of the rip cord body 60 with the handle 63 forms an important part of the present invention. The said handle 63 at the pocket inserting cross bar 65 has a transverse opening 66 through which the flexible cable body 60 is slidably threaded. The body 60 is provided with an enlargement 67 at its end which is larger than the opening 66 to prevent disconnection of the rip cord body 60 from the handle 63, yet permitting the sliding of the body 60 in a line normal to the length of the cross bar 65. This will permit the effective length of the cable 60 to shorten without pushing the handle 63 from its retaining pocket on the harness, as sometimes occurs with present day rip cords. This is considered of importance because release of the rip cord handle from the pocket in an accidental manner often results in catching of the same upon some part of the ship when moving about and is liable to result in a premature opening of the parachute pack.

A flexible metallic guard housing 70 is provided for the cable 60, which at one end is secured as by stitching 71, shown in Figure 1, to the flap 17. It is furthermore stitched at intermediate locations to parts of the harness D, as shown in Figure 6, upon the type of harness and pack used. The cable 60 of course slides freely through the housing 70.

The automatic rip cord 41 is of course adapted to be connected to some part of the air craft, and at its opposite end connected to the fastening mechanism of the pack so that the pack will automatically be ripped open during a parachute jump independent of manual release opening of the pack. To that end the automatic rip cord includes a flexible cable 80 of any desired length. It is relatively long so that the wearer may clear all parts of the ship during a parachute jump before the pack is ripped open. This cable 80 has an enlargement 81, preferably of cylindrical shape, at the end thereof, defining a shoulder 82 adapted to abut against the end of the retaining block or member 36 when the cable 80 lies in the channel of the block 36 so as to prevent displacement of the automatic rip cord 41 so long as the retaining block or member 36 is in the passageway of the case 45. At its opposite end the cable 80 is provided with a loop 84 securing thereto a snap fastener 85 of any approved type, which may be connected to some loop or ring or bar or other part of the aircraft.

The parachute pack at its end, on the flap 17 is provided with a pocket for housing the automatic rip cord 41. This pocket consists of a pair of pockets 90 and 91 opened in facing relation and slightly spaced at their open ends so that the flexible cable 80 of the rip cord 41 may be coiled back and forth in these pockets and retained, due to its inherent springiness, in border engagement with the pockets and against accidental displacement therefrom. It is to be noted that the pocket 90 is relatively longer than the pocket 91 and that the opened ends thereof are located laterally of the medial line of the pack, and thus not interfering with either the manual rip cord or its housing or the fastening mechanism comprising the cable 30, etc. These pockets except at their facing open ends are border stitched to the material of the flap 17. It is to be noted that in the finished pack the pocket lies truly at the end of the pack so that the wearer, in event the pack is of the seat type, will not sit upon or compress any part of the pocket.

Figure 2:
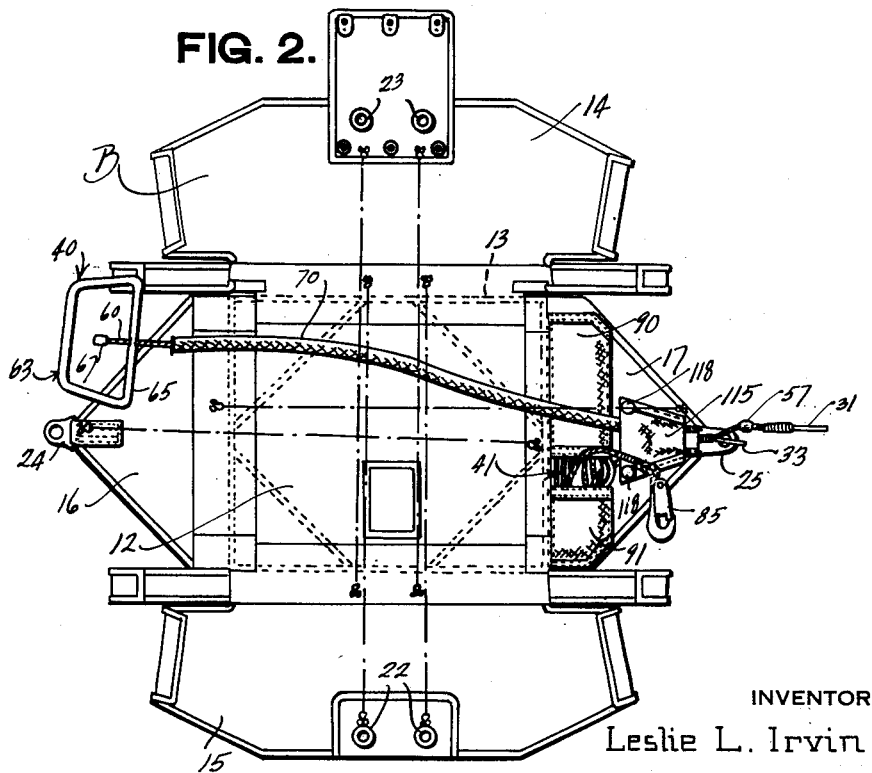
Figure 2 is an exterior view of the container of the parachute pack, in flattened condition, showing the relative association of parts of the manual and automatic rip cords.

In assemblage the case 45 and the grommet 25, which is a fixed part thereof, are stitched to the flap 17, at the medial line thereof; the flanges 51 and the base 47 being provided with openings 94 therein to receive stitches by means of which the case is attached to the flap 17, as is shown in the drawings. Of course the grommet 25 extends beyond the peak end of the flap 17 and the opening defined by the pocket 90 lies laterally of the line of the case 45, as is shown in Figure 2 of the drawings. In this space between the open ends of the pocket portions 90 and 91 there is disposed a guide ring 100 attached to the flap 17. The guide ring 100 is of D-shape, including a straight bar attaching portion 101 which is secured by webbing 102a to the flap 17, as shown in Figure 9 of the drawings. The arched bar portion 102 defines with the bar 101 a D-shaped opening through which the flexible cable 80 of the rip cord 41 is threaded. In cross section the bar portion 102 is of segmental shape, defining a convex surface, shown at 106 in Figure 9 of the drawings, which prevents either undue friction or injury to the cable 80 during a rip cord pull thereon.

Referring to an assemblage of the rip cords and fastening mechanism when the pack is closed, by referring to Figure 3 it will be noted that the pins 31 and 33 fit in the transverse openings of the apertured studs 22 so that the enlargement formed by the copper winding 32 of the pin 31 will abut one stud and prevent the unnecessary wedging of the ends of the other stud 22 between the body 30 of the fastening cable and the pin 33. This eliminates injury to the pin 33 or the cable 30, as well as unnecessary wear and binding which might prevent proper release of the fastening mechanism.

In assemblage, with the fastening pins in the relation above described, the retaining block or member 36 is disposed within the passageway of the housing 45. The rip cord cables 60 and 80 lie in the channels of this block, at opposite sides, and are laterally retained therein so long as the block 36 lies within the passageway of the case 45, as is quite apparent. The enlargements 61 and 81 upon the rip cords prevent the longitudinal pull of the rip cords unless the retainer block 36 moves therewith. As before mentioned, the manual rip cord extends through the flexible armored cable housing 70 to the rip cord ring or handle located in a pocket 110, or other appropriate retaining means on the person of the wearer. This pocket may vary as to location and construction, depending upon the type of parachute pack or harness used. The automatic rip cord 41 is arranged as above described, and the snap fastener 85 may be secured to any part of the aircraft desired.

As an added safeguard and protection to the housing 45, and to safeguard the manual and automatic rip cord cables and retaining member 36 against premature or accidental release opening I provide a fabric retaining piece 115, of trapezoidal construction, stitched at opposite edges, as shown at 116 in Figure 1 of the drawings, with the narrow end stitched along the convergent margins. It is stretched tautly across the intermediate and open ended portion of the housing 45. The wider end of this guard strap 115 defines a flap and it is provided with glove type snap fasteners 118 so located that the flap end when secured upon the flap 17 in the position shown in Figure 2 of the drawings will entirely cover the end of the manual cable body 60 which extends from the guard housing 70 and also guards and protects the automatic rip cord cable close to the opening of the pocket on the flap which receives the same. This safeguards against accidental catching of the rip cord cables upon anything which would result in a premature release of the retaining block or member 36 from the housing 45.

The operation of the rip cord and fastening mechanism will be apparent from the foregoing. A dual release is provided which enables a wearer to either use the manual rip cord or the automatic rip cord with absolute assurance that the pack will be properly opened with the least liability of injury to the wearer or loss or destruction of parts of the pack.

To effect a manual release it is of course necessary for the wearer to jump from the aircraft. A pull upon the manual rip cord through the handle 63 will, due to engagement of the enlargement 67 against the bar 65, pull the flexible manual rip cord cable 60 through the housing 70 and due to engagement of the enlargement 61 against the retaining block 36, the latter will be slid through the passageway 52 and released from the casing 45. Immediately thereafter the rip cord 60 releases laterally from the channel of the retaining block 36. This movement of the retaining block 36 from the housing 45 of course pulls the fastening pins from the apertured studs of the pack container and opens the pack.

To effect an automatic opening of the pack the snap fastener 85 is secured to the aircraft. During a parachute jump the dropping of the wearer from the ship causes a deployment of the cable 80 from the pocket in which it is retained. When the cable 80 is taut it will pull the retaining block or member 36 from the casing 45 to release and open the pack in the manner above described. Threading of the cable 80 through the ring 100 insures that a direct lineal pull will be made upon the retaining block 36, at all times, in the same direction, independent of the direction or position of the wearer with respect to the ship at the time that the cable 80 is rendered taut.

It will be apparent from the foregoing that a dual parachute pack releasing mechanism has been provided for the fastener parts of the pack which enables the fastening mechanism to be effectively and easily released, with safety, so that the manual and automatic rip cords will be relatively released with respect to each other and with respect to the fastening mechanism at the time of opening of the pack. It is to be noted that both rip cords are releasable with respect to the fastening parts. This is important, not only from the standpoint of safety, but also from the standpoint of efficiency in operation, assemblage, and economy in replacement of parts.

Any type of safetying means may be provided to prevent premature pull of the fastening means. This is conventionally done by attaching either a break cord or a taut elastic cord to the fastening means extended to some point of connection with the container such as shown in U. S. Patent #1,899,713.

Various changes in the shape, size, and arrangement of parts may be made to the form of invention herein shown and described, without departing from the spirit of the invention or the scope of the claims.

I claim:

1. In a parachute pack the combination of a container having a closure, fastening means for the closure, independent manual and automatic rip cords both releasably connected to said fastening means in order to effect a release of the fastening means, and means for retaining the connection of both of said rip cords with said fastening means only until the latter is moved to a position for the release opening of the container closure.

2. In a parachute pack releasing mechanism the combination with a parachute pack having closure means therefor, fastening means for retaining the closure in a shut condition, guide means for directing the line of travel of said fastening means in order to effect a release opening of the closure, and independent manual and automatic rip cord devices connected with the fastening means and held so connected by said guide means, said connections each being automatically releasable from the fastening means as soon as the fastening means is moved to release open the parachute closure.

3. In a parachute pack opening mechanism the combination of fastening means for the parachute pack having lateral openings on a portion thereof, automatic and manual rip cords each releasably disposed in said openings, means on each of said rip cords to engage said fastening means portion and move the fastening means to a releasing position when either of said rip cords are pulled, and means to maintain said rip cords in said openings until the fastening means has reached a pack opening position.

4. In parachute apparatus the combination of a pack including a container having closure means therefor, fastening means for the closure including a retaining enlargement having lateral openings therein, rip cords each having enlargements at the ends thereof, said rip cords adapted to lie in the openings of said retaining member with the enlargements thereof abutting said member whereby a pull upon said rip cord will pull the member therewith to effect a release movement of the fastening means, and means for releasably holding said rip cords in the openings of the retaining member until the fastening means has reached a release position for the closure means.

5. In a parachute pack releasing construction the combination of a container having closure means, fastener means for the closure means, said fastener means including a retaining member, means for slidably guiding the retaining member non-rotatably in position, and manual and automatic rip cords both releasably connected with said retaining member by said last mentioned means only so long as the fastening means secures the closure in position.

6. In a parachute pack the combination of a container having closure means therefor, a guide casing on the pack, pack closure fastening means slidably connected with said casing, manual and automatic rip cords, means on said rip cords and on the fastening means releasably insertable in said guide casing for releasably connecting and holding the rip cords connected to said fastening means so long as the fastening means is in a closure fastening position, and means on the fastening means to limit the movement of the same with respect to the casing to prevent loss of the fastening means.

7. In a parachute pack releasing mechanism the combination with a parachute pack having closure means therefor, fastening means for retaining the closure in a shut condition, a casing having a passageway therein, a block connected with said fastening means and snugly slidable in the passageway of the casing without lateral play or rotation, and manual and automatic rip cord devices independently releasably connected with the block and releasable therefrom when the block is pulled out of the passageway of said casing and the fastening means is in a releasing position.

8. In a parachute pack fastening and releasing mechanism the combination of a fastening device, an elongated guide casing having a passageway therein, a block connected with the fastening means and slidable longitudinally in the passageway in a non-rotatable snug fitting sliding relation in the casing and removable therefrom when the fastening means is in a releasing position, said block having a grooved opening on a face thereof, a rip cord having a portion for fitting in said opening of the block and having an enlargement at the end thereof whereby the block when fitting in the passageway of the guide casing will retain the rip cord in said grooved opening of the guide block with the enlargement of the rip cord in position to prevent withdrawal of the rip cord from the casing unless the guide block and fastening means is moved therewith to a releasing position of the latter.

9. In a parachute pack fastening and releasing mechanism the combination of an elongated guide casing having a passageway therein, a guide block snugly fitting for non-rotatable sliding in the passageway of the casing and removable therefrom, pack fastening means connected with said pack at an end thereof and extensible from the casing at the opposite end from which the slide block is removable when the fastening means is positioned in a releasing relation, said block having a plurality of face opening grooves on the guide block, and a plurality of rip cords independently fitted into said grooves and having enlargements thereon to prevent withdrawal of the rip cords unless the guide block is withdrawn from said casing.

10. A rip cord construction for parachute packs comprising a short length of cable having a fastener pin thereon and a rip cord retainer, a casing normally slidably receiving the retainer therein, the said casing and flexible cable being of such construction that the retainer may move out of the casing sufficient to release a rip cord therefrom, and manual and automatic flexible rip cords both releasably connected with the retainer and held attached thereto only when the retainer is in pack fastening position and within the casing.

LESLIE L. IRVIN.